(12) United States Patent
De Goes et al.

(10) Patent No.: US 10,192,346 B2
(45) Date of Patent: Jan. 29, 2019

(54) GENERATING UV MAPS FOR MODIFIED MESHES

(71) Applicant: Pixar, Emeryville, CA (US)

(72) Inventors: Fernando Ferrari De Goes, Berkeley, CA (US); Mark Meyer, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 15/279,252

(22) Filed: Sep. 28, 2016

(65) Prior Publication Data

US 2018/0089883 A1    Mar. 29, 2018

(51) Int. Cl.
| G06T 15/00 | (2011.01) |
| G06T 15/04 | (2011.01) |
| G06T 19/20 | (2011.01) |
| G06T 17/20 | (2006.01) |
| G06T 11/00 | (2006.01) |

(52) U.S. Cl.
CPC ............ G06T 15/04 (2013.01); G06T 11/001 (2013.01); G06T 17/205 (2013.01); G06T 19/20 (2013.01)

(58) Field of Classification Search
CPC ..... G06T 17/205; G06T 7/75; G06T 2200/24; G06T 2207/10028; G06T 2210/16; A41H 1/02
USPC .......................................................... 345/419
See application file for complete search history.

(56) References Cited

U.S. PATENT DOCUMENTS

| 6,907,310 B2 * | 6/2005 | Gardner .................. A41H 1/00 700/132 |
| 7,657,341 B2 * | 2/2010 | Lind ....................... A41H 3/007 700/131 |
| 8,411,090 B2 * | 4/2013 | Wang ..................... G06T 19/00 345/427 |
| 8,590,469 B2 * | 11/2013 | Ko .......................... D04H 3/05 112/475.09 |

(Continued)

OTHER PUBLICATIONS

Tarini M. Volume-encoded UV-maps. ACM Transactions on Graphics (TOG). Jul. 11, 2016;35(4):107.*

(Continued)

*Primary Examiner* — Phu K Nguyen
(74) *Attorney, Agent, or Firm* — Patterson + Sheridan, LLP

(57) ABSTRACT

This disclosure provides an approach for automatically generating UV maps for modified three-dimensional (3D) virtual geometry. In one embodiment, a UV generating application may receive original 3D geometry and associated UV panels, as well as modified 3D geometry created by deforming the original 3D geometry. The UV generating application then extracts principal stretches of a mapping between the original 3D geometry and the associated UV panels and transfers the principal stretches, or a function thereof, to a new UV mapping for the modified 3D geometry. Transferring the principal stretches or the function thereof may include iteratively performing the following steps: determining new UV points assuming a fixed affine transformation, determining principal stretches of a transformation between the modified 3D geometry and the determined UV points, and determining a correction of a transformation matrix for each triangle to make the matrix a root of a scoring function.

20 Claims, 4 Drawing Sheets
(1 of 4 Drawing Sheet(s) Filed in Color)

(56) References Cited

U.S. PATENT DOCUMENTS

| | | | | |
|---|---|---|---|---|
| 8,674,989 B1* | 3/2014 | Dalal | ................ | G06T 15/50 |
| | | | | 345/419 |
| 8,878,850 B2* | 11/2014 | Harvill | ................ | G06T 15/04 |
| | | | | 345/418 |
| 9,305,387 B2* | 4/2016 | Corazza | ................ | G06T 17/20 |
| 9,477,979 B2* | 10/2016 | Harvill | ................ | G06Q 30/06 |
| 9,702,071 B2* | 7/2017 | Harvill | ................ | D05C 5/04 |
| 9,754,410 B2* | 9/2017 | Hua | ................ | G06T 17/205 |

OTHER PUBLICATIONS

Brown, Michael S., Mingxuan Sun, Ruigang Yang, Lin Yun, and W. Brent Seales. "Restoring 2D content from distorted documents." IEEE Transactions on pattern analysis and machine intelligence 29, No. 11 (2007).*

Brown, M. S., & Pisula, C. J. (Jun. 2005). Conformal deskewing of non-planar documents. In Computer Vision and Pattern Recognition, 2005. CVPR 2005. IEEE Computer Society Conference on (vol. 1, pp. 998-1004). IEEE.*

Koo Hi, Kim J, Cho Ni. Composition of a dewarped and enhanced document image from two view images. IEEE Transactions on Image Processing. Jul. 2009;18(7):1551-62.*

* cited by examiner

GENERATING UV MAPS FOR MODIFIED MESHES

BACKGROUND

Field of the Invention

Aspects of the disclosure presented herein relate to rendering of three-dimensional virtual geometry. More specifically, this disclosure presents techniques for automatically generating UV maps for modified 3D meshes.

Description of the Related Art

UV mapping is an approach for mapping two-dimensional (2D) textures to three-dimensional (3D) geometry. The letters "U" and "V" in UV mapping denote axes of the 2D texture, as opposed to the X, Y, Z coordinates of the 3D geometry. Artists will often meticulously place UVs in relation to 3D geometry they create by flattening the 3D geometry into one or more corresponding 2D UV panels. However, when the 3D geometry is changed, such as through deformation, the existing UV panels are typically just copied and pasted onto the changed 3D geometry. This can cause textures mapped to the changed 3D geometry via the UV panels to not look correct, or to not maintain the same relationship with the underlying 3D geometry as before the geometry was changed. To remedy this problem, artists would have to manually create a new UV map with different UV panels for the changed 3D geometry.

SUMMARY

One embodiment provides a computer-implemented method for generating two-dimensional (2D) panel representations of three-dimensional (3D) geometry. The method generally includes receiving a first 3D geometry, one or more 2D panels associated with the first 3D geometry, and a second 3D geometry, where the second 3D geometry is created by deforming the first 3D geometry. The method further includes, for each of the 2D panels associated with the first 3D geometry: determining principal stretches of a mapping from the first 3D geometry to the 2D panel associated with the first 3D geometry, and transferring the determined principal stretches, or a function thereof, to a mapping from the second 3D geometry to a new 2D panel which corresponds to the 2D panel associated with the first 3D geometry.

Further aspects include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of aspects of this disclosure, briefly summarized above, may be had by reference to the appended drawings. It is to be noted, however, that the appended drawings illustrate only typical aspects and are therefore not to be considered limiting of its scope, for the invention may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
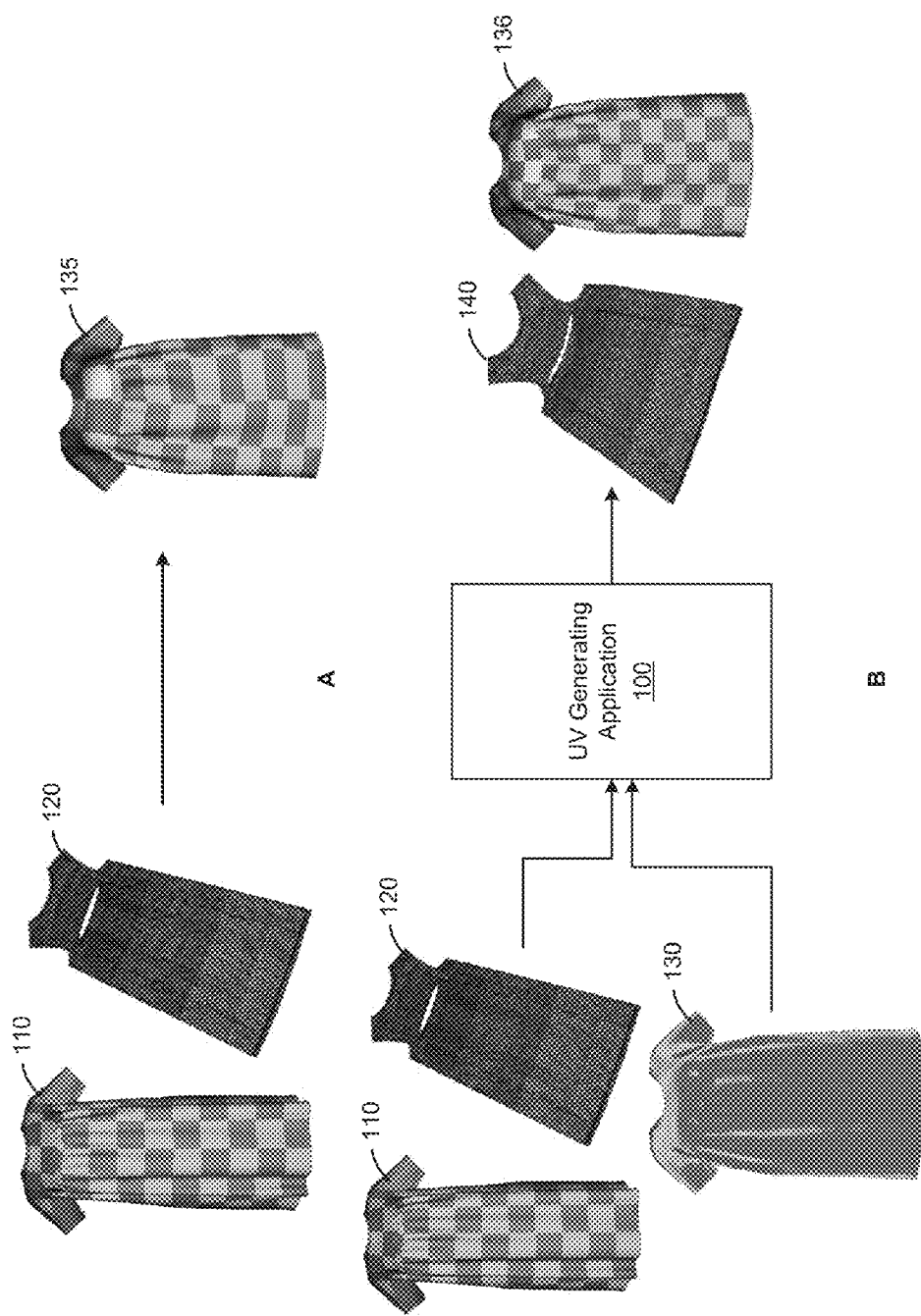
FIG. 1 illustrates an approach for automatically generating UV maps for modified three-dimensional (3D) geometry, according to an embodiment.

Embodiments disclosed herein provide techniques for automatically generating UV maps for modified three-dimensional (3D) virtual geometry. In one embodiment, a UV generating application may receive original 3D geometry and associated UV panel(s), as well as modified 3D geometry created by deforming the original 3D geometry. To generate UV panel(s) for the modified 3D geometry, the UV generating application first extracts principal stretches of a mapping between the original 3D geometry and the associated UV panel(s), and the UV generating application then transfers the principal stretches, or a function thereof, to a mapping from the modified 3D geometry to new UV panel(s). As used herein, "principal stretches" generally refer to the longest and shortest stretches in transforming a triangle in a 3D geometry to a corresponding triangle in a UV panel, similar to the principal axes of an ellipse. In one embodiment, transferring the principal stretches or a function thereof may include iteratively performing the following steps until a terminating condition is met: determining new UV points assuming a fixed affine transformation, determining principal stretches of a transformation between the modified 3D geometry and the new UV points, and determining a correction of a transformation matrix for each triangle to make the matrix a root of a scoring function. The scoring function itself may be any function of the principal stretches, such as a function that helps constrain the principal stretches of a mapping from the original 3D geometry to the associated UV panel(s) to be the same as principal stretches of a mapping between the modified 3D geometry and the new 2D panel(s).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a UV generating application) or related data available in the cloud. For example, the UV generating application could execute on a computing system in the cloud and generate a new UV mapping for modified 3D geometry. In such a case, the UV application may output new UV panel(s) after receiving as inputs original 3D geometry, associated UV panel(s), and modified 3D geometry, and store the new UV panel(s) at a storage location in the cloud. Doing so allows a user to access this information from any computing system attached to a network connected to the cloud (e.g., the Internet).

Referring now to FIG. 1, an approach for automatically generating UV maps for modified 3d geometry according to an embodiment is shown. Panel A shows 3D geometry 110 in the form of a triangular mesh representing a dress and an associated UV map 120 which is applied to map a checkerboard texture to the 3D geometry 110. As discussed, the UV map 120 may be created by an artist who flattens the 3D geometry 110 out into one or more 2D UV panels. It should be understood the triangles that are glued together to form the 3D geometry 110 mesh are all transferred to the UV map 120. In general, one or more UV panels made up of triangles may be created by the artist, or through an automated process. During rendering of a scene with the 3D geometry 110, the UV map 120 may be used to project a desired 2D texture (e.g., the checkerboard texture) to the 3D geometry 110 through known techniques so as to generate an image in which the 3D geometry 110 has the desired texture.

Panel A also shows a modified 3D geometry 135 of the dress and the result of using the same UV map 120 to transfer the checkerboard texture to the modified 3D geometry 135. For example, the 3D geometry 110 of the dress may be deformed to change its shape to that of a modified 3D geometry so that the dress can be used with a different character. Traditionally, an artist would then apply the same UV map 120 that was created for the original 3D geometry 110 to the modified 3D geometry 135. However, as shown, applying the same checkerboard texture to the modified 3D geometry 135 using the UV map 120 results in a distorted version of the checkerboard texture on the modified 3D geometry 135, as the UV map 120 was not created for the modified 3D geometry 135.

As shown in panel B, a UV generating application 100 receives as inputs the original 3D geometry 110 of the dress, the original UV map 120 associated with the original geometry 110, and modified 3D geometry 130 of the same dress. In turn, the UV generating application 100 automatically generates a new UV map 140 for the modified 3D geometry 130 based on these inputs, with the new UV map 140 being capable of projecting the checkerboard texture onto the modified 3D geometry 130 to produce a textured geometry 135 that does not have the distortion discussed above with respect to the UV map 120. That is, the UV map 140 is created so that the quality of a texture when applied to the modified 3D geometry 130 is substantially the same as the quality of the texture when applied to the original 3D geometry 110. Although a dress is shown as a reference example, it should be understood that techniques disclosed herein for generating UV maps may also be applied to other 3D mesh geometries.

Figure 2:
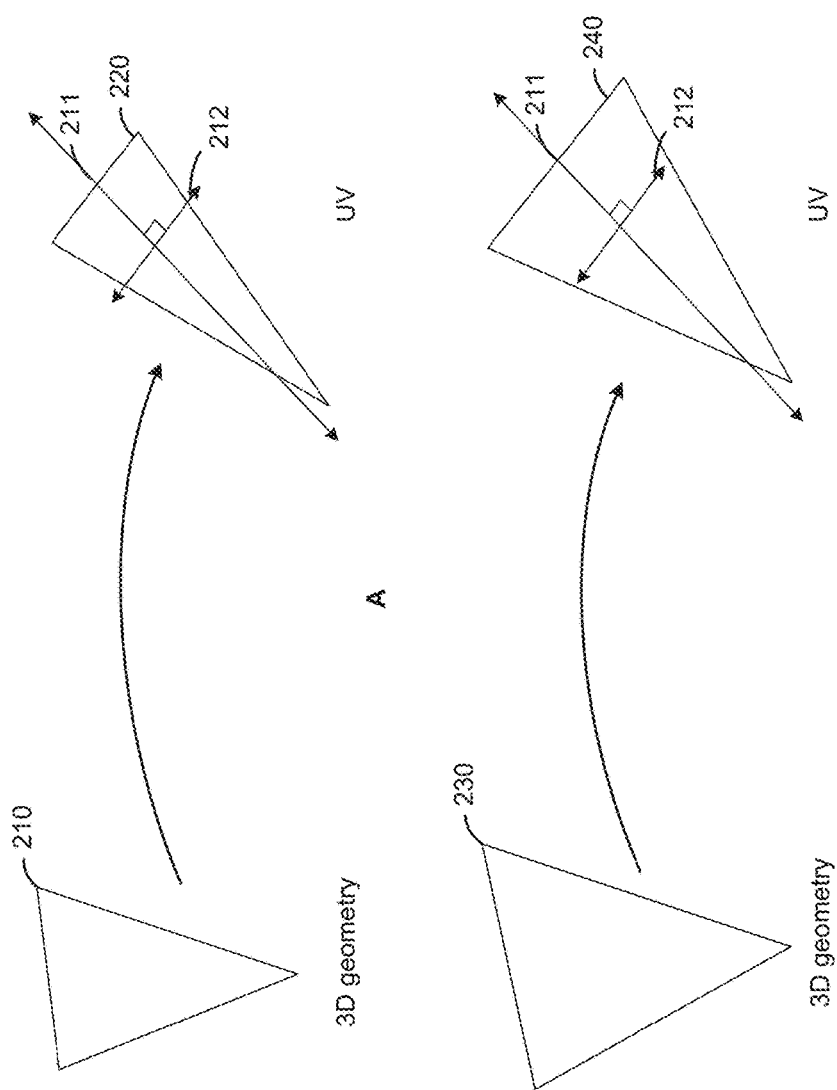
FIG. 2 illustrates principal stretches and a transfer of the same, according to an embodiment.

In one embodiment, the UV generating application 100 is configured to extract principal stretches of the mapping from the original 3D geometry 110 to the associated UV map 120. As discussed, the principal stretches of each triangle are the longest and shortest stretches in transforming the triangle in 3D geometry to a corresponding triangle in a UV map. For example, panel A of FIG. 2 illustrates the principal stretches 211 and 212 in transforming a triangle 210 in the original 3D geometry 110 to a triangle 220 in the UV map 120. Each principal stretch has a direction, known as the principal axis, and as shown the principal axes are always orthogonal to each other. Let M indicate connectivity of a triangle mesh with triangles ijk and vertices i, the 3D position of vertex i be denoted by $x_i$ and its 2D texture coordinate given by $u_i$. Further, let the points of the original 3D geometry 110 in the mesh M be $\bar{x}$ and the associated 2D texture coordinates of the UV map 120 for the same mesh M be $\bar{u}$. In one embodiment, to obtain the principal stretches of the mapping from $\bar{x}$ to $\bar{u}$, the UV generating application 100 first computes the affine transformation (A,t) that maps the 3D to the 2D locations of each triangle in the mesh M and then extracts the principal stretches ($\bar{\sigma}_1$, $\bar{\sigma}_2$) of such an affine transformation. It should be understood that such an affine transformation includes the rotation, scaling, and shearing in transforming the triangles of the 3D geometry 110 into the corresponding triangles of the 2D UV map 120, and the principal stretches, or a function thereof, are information that should be preserved in creating the new UV map 140 for the modified 3D geometry 130 so as to not introduce texture distortions. More formally, for each triangle ijk, the UV generating application 100 minimizes the following equation to determine the affine transformation for that triangle:

$$\min_{A_{ijk}, t_{ijk}} \Sigma_{i \subset ijk} \|A_{ijk} \bar{x}_i + t_{ijk} - \bar{u}_i\|^2, \quad (1)$$

where $A_{ijk}$ is a 2×3 matrix and $t_{ijk}$ is a 2D vector. The UV generating application 100 then computes the singular value decomposition of $A_{ijk}$, which provides as singular values the principal stretches ($\bar{\sigma}_1$, $\bar{\sigma}_2$). It should be understood that when $\bar{x}$ is the original 3D geometry 100 and $\bar{u}$ is the UV map 120, the corresponding singular values ($\bar{\sigma}_1$, $\bar{\sigma}_2$) are referred to herein as $\bar{\sigma}_i$. However, as discussed in greater detail below, equation (1) is also solved in every iteration of a method between modified geometry x and new UV points u, and these intermediate singular values are used to compute a residual to ($\bar{\sigma}_1$, $\bar{\sigma}_2$). Equation (1) is then a building block used in initialization and in every iteration of this method.

Having obtained the principal stretches ($\bar{\sigma}_1$, $\bar{\sigma}_2$) of the mapping from the original 3D geometry 110 to the associated UV map 120, the UV generating application 100 then transfers those principal stretches to the transformation between the modified 3D geometry 130 and a new UV map 140 that the UV generating application 100 generates. That is, given 3D points x of the modified 3D geometry 130, the UV generating application 100 solves for new 2D texture coordinates u of the UV map 140 so that the principal stretches ($\sigma_1$, $\sigma_2$) of the mapping from the modified 3D geometry 130 to the new UV map 140, or some function thereof, matches the original principal stretches ($\bar{\sigma}_1$, $\bar{\sigma}_2$), or the same function of those stretches. For example, panel B of FIG. 2 illustrates that the same principal stretches 211 and 212 are in the mapping from a triangle 230 of the modified 3D geometry 130 to a triangle 240 in the new UV map 140.

In one embodiment, solving for the new 2D texture coordinates u of the UV map 140 so that the principal stretches ($\sigma_1$, $\sigma_2$) of the mapping from the modified 3D geometry 130 to the new UV map 140 (or some function thereof) matches the original principal stretches ($\bar{\sigma}_1$, $\bar{\sigma}_2$) (or the same function of those stretches) may include minimizing:

$$\min_{u,A,t} \Sigma_{ijk} \text{area}_{ijk} [\Sigma_{i \subset ijk} \|A_{ijk} x_i + t_{ijk} - u_i\|^2] \text{ s.t. } f(A_{ijk}) = 0. \quad (2)$$

As discussed in greater detail below, this minimization may be achieved in one embodiment by alternating the steps of fixing the affine transformation (A,t) for each triangle and solving for the 2D points u over the entire mesh by minimizing equation (2), which reduces to an unconstrained quadratic minimization that can be solved via a linear system; fixing u and computing the affine transformation (A,t) for each triangle and obtaining the principal stretches ($\sigma_1$, $\sigma_2$) for the new mesh, which is equivalent to equation (1) except that new points x and u are being used rather than $\bar{x}$ and $\bar{u}$; and correcting the matrix A for each triangle ijk so that the corrected matrix is a root of the scoring function $f$, i.e., computing the root where $f(A)=0$.

In one embodiment, the scoring function $f$ effectively compares the principal stretches ($\sigma_1$, $\sigma_2$) of the new matrix A for a given triangle to the original principal stretch values ($\bar{\sigma}_1$, $\bar{\sigma}_2$) and makes them match. Mathematically, such a scoring function may have form $f(A)=\Sigma_i\|\sigma_i-\bar{\sigma}_i\|^2$, which may be used to force the singular values (principal stretches) of the new transformation matrix to be exactly the same as the original singular values. The scoring function $f(A)=\Sigma_i\|\sigma_i-\bar{\sigma}_i\|^2$ accounts for the principal stretches in the least squares senses by summing the squared difference of the original principal stretches and the new principal stretches, which is also referred to herein as a "residual." It should be understood that each triangle has its own scoring function, and the residual of each triangle incident to a vertex is summed to determine how much the UV of that vertex needs to be adjusted. The goal is then to reduce these residuals at each step of the iteration discussed above until no further progress can be made (e.g., the residuals decrease by less than a threshold value from one iteration to another). In one embodiment, the UV generating application 100 may first compute the singular value decomposition $A=U\Sigma V^t$, where $\Sigma$ is a 2×3 matrix with singular values ($\sigma_1$, $\sigma_2$) at the diagonal (and zero everywhere else), and U and V are orthogonal matrices. The UV generating application 100 may then compute the least amount of correction $\delta_i$ for the singular value $\sigma_i$ so that the reconstructed matrix $\tilde{A}=U\tilde{\Sigma}V^t$ with singular values $\sigma_i+\delta_i$ corresponds to the root of $f$, i.e., $$\min_{(\delta_1,\delta_2)} \Sigma_i \|\delta_i\|^2 \; s.t. \; f(\tilde{A})=0, \qquad (3)$$

where $\delta_i$ is the residual.

In other embodiments, the scoring function $f$ may take other forms, depending on the application or artistic preference. The procedure discussed above for finding the root of $f$ to correct the matrix A of each triangle may also be applied in these cases. For example, the scoring function $f(A)=\Sigma_i\|\sigma_i-\bar{\sigma}_i\|^2$ tends to produce the least amount of overall distortion, but the resulting deformation in the UV map may be so great that the residuals are always relatively large (i.e., not 0). In such a case, a different scoring function $f$ may be chosen. For example, another scoring function may take the form $f(A)=\|\sigma_1/\sigma_2-\bar{\sigma}_1/\bar{\sigma}_2\|^2$, which compares the ratio of the original principal stretches to the ratio of the new principal stretches. Such a scoring function would allow the triangles to scale (i.e., get larger or smaller) but not shear. As yet another example, the scoring function may take the form $f(A)=\|\sigma_1\sigma_2-\bar{\sigma}_1\bar{\sigma}_2\|^2$, which compares the product of the original principal stretches to those of the new principal stretches. Such a scoring function would preserve the area of the triangle and allow the triangle to shear but not scale, with a stretch in one direction always compensating a stretch in another to preserve triangle area. In general, any arbitrary scoring function may be used (e.g., polynomials, logarithms, compositions of these, etc.).

Figure 3:
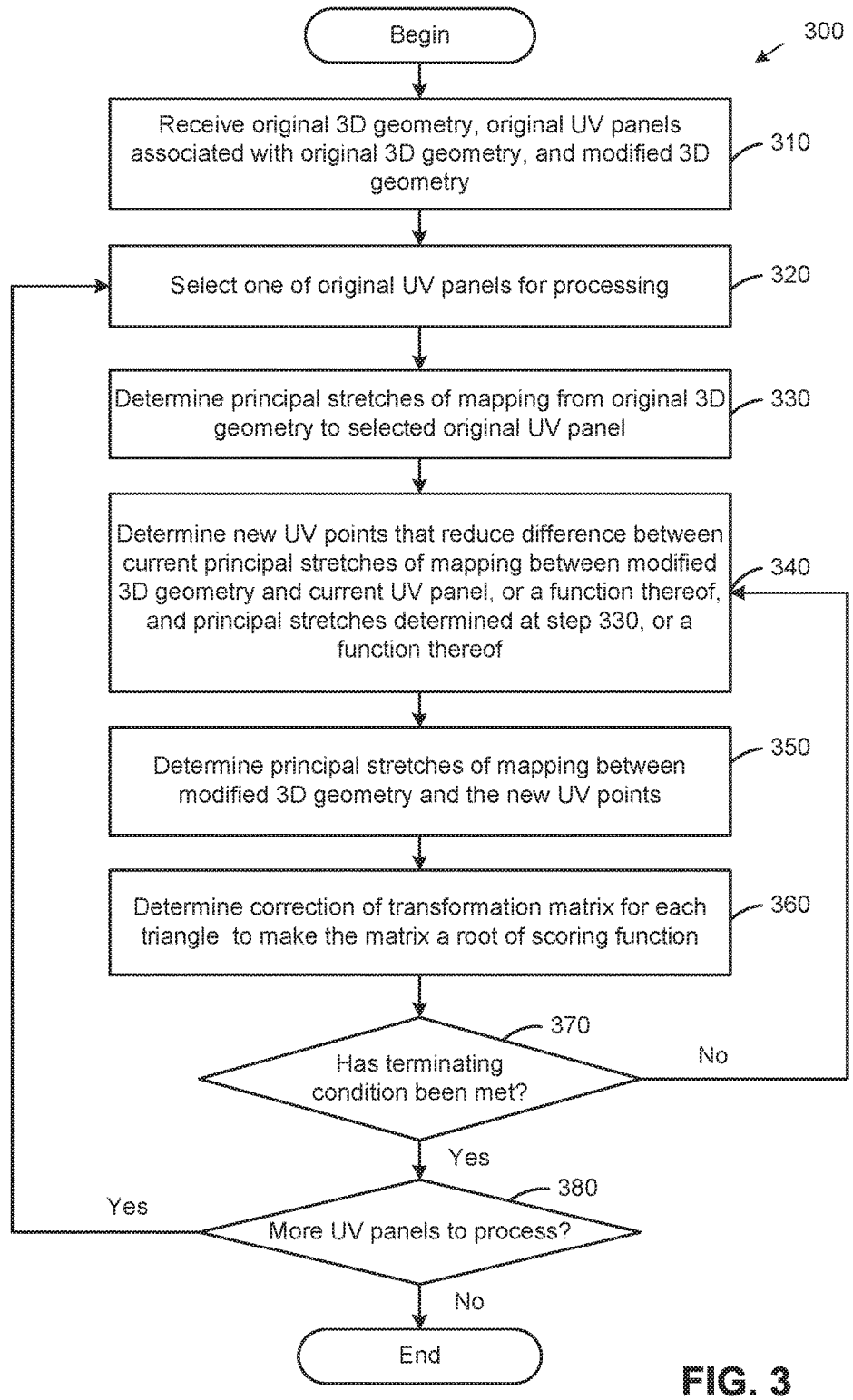
FIG. 3 illustrates a method for generating new UV maps, according to an embodiment.

FIG. 3 illustrates a method 300 of generating new UV maps, according to an embodiment. As shown, the method 300 begins at step 310, where the UV generating application 100 receives an original 3D geometry, original UV panels associated with the original 3D geometry, and a modified 3D geometry. Then at step 320, the UV generating application selects one of the original UV panels for processing. It should be understood that an artist may create one or multiple 2D UV panels for each 3D mesh. For example, the sleeves of a dress may be separated into UV panels that are distinct from a UV panel for a body of the dress. The UV generating application takes such UV panels created by the artist for the original 3D geometry as input and iterates through them (in any feasible order), creating corresponding new UV panels for the modified 3D geometry.

At step 330, the UV generating application 100 determines principal stretches of the mapping from the original 3D geometry to the selected original UV panel. As discussed, to determine the principal stretches of a given triangle, the UV generating application may compute an affine transformation (A,t) that maps the triangle in the original 3D geometry to the triangle in the UV panel using equation (1), and then extract the principal stretches as the singular values from a singular value decomposition of the transformation matrix $A_{ijk}$. This procedure may be performed for all triangles in the selected original UV panel at step 330.

At step 340, the UV generating application 100 determines new UV points (of a new UV panel) that reduce the difference between the current principal stretches of a mapping between the modified 3D geometry and a current UV panel, or a function thereof, and the principal stretches of the mapping from the original 3D geometry to the original UV panel determined at step 330, or a function thereof. It should be understood that this is one step of an iterative process, which may begin with the original UV panel and successively determine UV points to reduce the difference between principal stretches. In one embodiment, the UV generating application may fix the affine transformation (A,t) associated with each triangle (the transformations may vary from one triangle to another) and minimize equation (2) to solve for 2D points u of the new UV panel, which as discussed reduces to an unconstrained quadratic minimization that may be solved using a linear system. It should be understood that doing so moves the vertices of the triangles in the UV panel, and all the triangles are updated at the same time. For vertices that belong to a number of triangles, the vertices may be updated once based on the influence of all the triangles to which they belong in a weighted average based on differences between the current principal stretches, or a function thereof, for each of the triangles and the desired principal stretches determined at step 330, or a function thereof, for each of the number of triangles, according to equation (2).

Solving the linear system to minimize equation (2) gives perfect new UV points to compensate for the current residuals (i.e., the difference for the triangles between the current principal stretches, or a function thereof, and the desired principal stretches of the mapping from the original 3D geometry to the original UV panel determined, or a function thereof). However, after solving the linear system to obtain new UV points, the principal stretches may be recomputed and will then be different, which may again require another correction to the UV points (i.e., repeating step 340) to compensate for other residuals. This iterative process gets closer to the desired solution by reducing the residuals at each iteration.

At step 350, the UV generating application 100 determines principal stretches of the mapping between the modified 3D geometry and the UV points determined at step 340. Here, the UV generating application may fix the 2D points u determined at step 340 and compute the affine transformation (A,t) for each triangle and the principal stretches ($\sigma_1$, $\sigma_2$) that are the singular values of the affine transformation matrix A, using equation (1) but replacing the original 3D geometry $\bar{x}$ and UV $\bar{u}$ with the new 3D geometry x and UV u.

At step 360, the UV generating application 100 determines a correction of the transformation matrix A for each triangle to make the corrected matrix $\tilde{A}$ a root of the scoring function $f$. That is, each triangle has its own scoring function, so the root is computed triangle by triangle. Then, the residual of each triangle incident to a vertex is summed to determine how much the UV of that vertex needs to be adjusted, as discussed above. The UV generating application in one embodiment may compute a singular value decomposition of the matrix A, i.e., $A=U\Sigma V^t$, and then determine the corrected matrix $\tilde{A}$ with singular values $\sigma_i+\delta_i$, where $\delta_i$ is a least amount of correction applied to the singular value $\sigma_i$, so that $\tilde{A}$ is a root of the scoring function $f$. This is shown above formally as equation (3). That is, the scoring function $f$ contributes to the linear system of step 340 through its root, with the right hand side of the linear system corresponding to equation (2) being evaluated at the root of the scoring function $f$, which is where the value of the scoring function $f$ becomes zero.

The scoring function itself $f$ may be any feasible function of principal stretches, such as $f(A)=\Sigma_i\|\sigma_i-\overline{\sigma}_1\|^2$, which forces the original and new principal stretches to be equal when this scoring function is 0; $f(A)=\|\sigma_1/\sigma_2-\overline{\sigma}_1/\overline{\sigma}_2\|^2$, which forces the ratio of the original principal stretches and the ratio of the new principal stretches to be equal when this scoring function is 0; and $f(A)=\|\sigma_1\sigma_2-\overline{\sigma}_1\overline{\sigma}_2\|^2$, which forces the product of the original principal stretches and the product of the new principal stretches to be equal when this scoring function is 0, depending on the application or artistic preference. As discussed, each triangle has its own scoring function, and the root is computed triangle by triangle. As further noted above, the residuals of each triangle are reduced in each iteration by correcting the new UV panel so that the transformation from the deformed 3D geometry to the new UV panel has smaller residuals than before.

At step 370, the UV generating application 100 determines if a terminating condition has been met. In one embodiment, the terminating condition may be that no further progress is being made as determined based on, e.g., the residuals computed being reduced less than a threshold value from the previous iteration to the current iteration. If the terminating condition has not been met, then the method 300 returns to step 340, where the UV generating application 100 again solves a linear system to determine new UV points assuming a fixed affine transformation.

If the UV generating application determines 100 instead that the terminating condition has been met at step 370, then the method 300 proceeds to step 380, where the UV generating application 100 determines whether there are additional UV panels to process. If there are additional UV panels to process, then the method 300 returns to step 320, where the UV generating application 100 selects another one of the UV panels associated with the original 3D geometry for processing. Otherwise, the method 300 ends if there are no additional UV panels to process.

Figure 4:
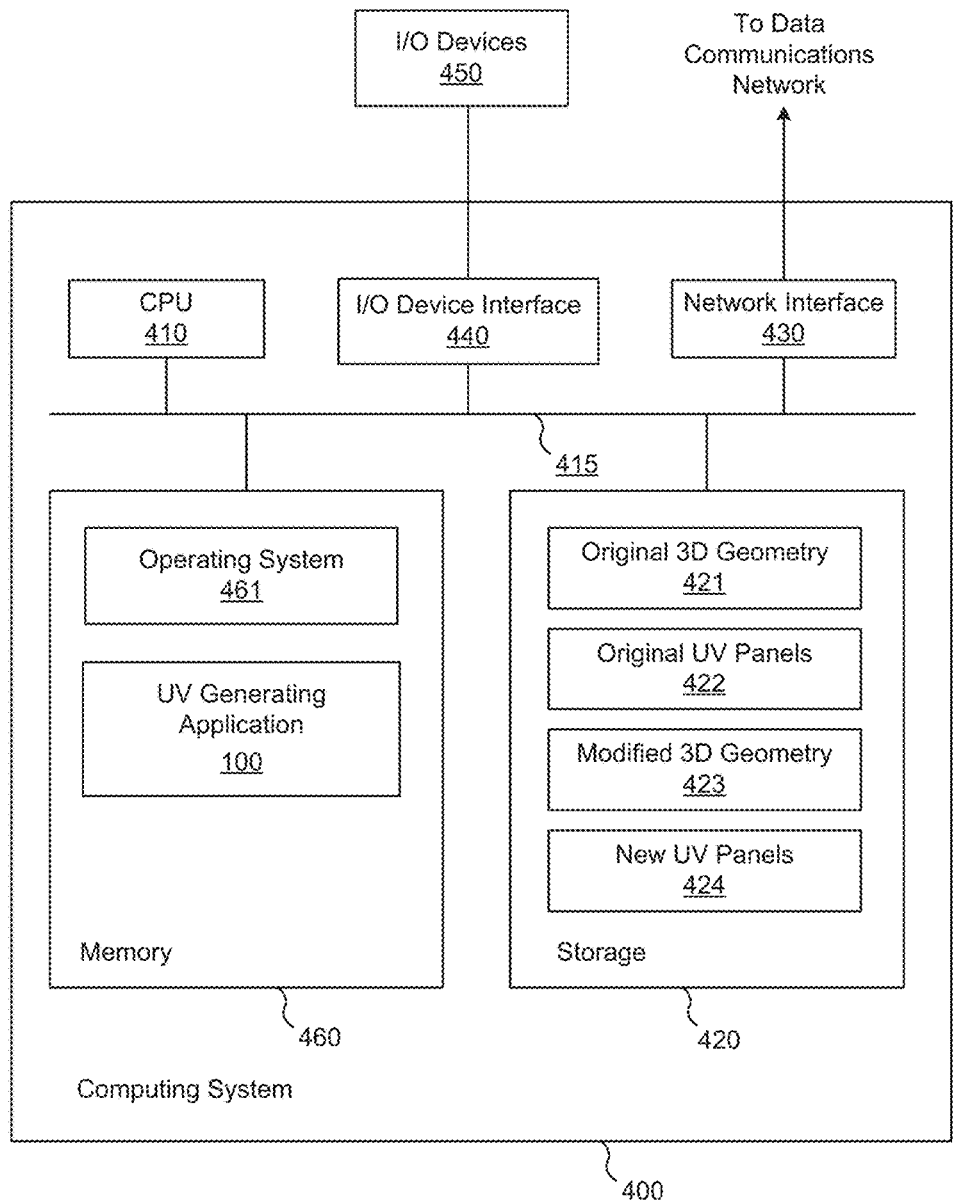
FIG. 4 illustrates a computer system in which an embodiment may be implemented.

FIG. 4 illustrates a system 400 in which an embodiment may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as fixed disc drives, flash drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and the UV generating application 100. For example, the operating system 461 may be Microsoft Windows®. The UV generating application 100 is configured to receive as inputs an original 3D geometry 421, UV panels associated with the original 3D geometry 422, and a modified 3D geometry 423 and generate a new UV mesh 424 for the modified 3D geometry 423. Although shown as an application executed by CPU 410, the UV generating application 100 may be implemented differently in other embodiments, e.g., as shaders or in fixed function hardware in a graphics processing unit (GPU), or as a combination of hardware and software. In one embodiment, the UV generating application 100 may be configured to receive an original 3D geometry, UV panels associated with the original 3D geometry, and a modified 3D geometry; select one of the UV panels for processing; determine principal stretches of a mapping from the original 3D geometry to the selected UV panel; determine new UV points assuming a fixed affine transformation; determine principal stretches of the mapping between the modified 3D geometry and the previously determined UV points; determine a correction of the transformation matrix for each triangle to make the corrected matrix a root of the scoring function; return to the step of determining new UV points if a terminating condition has not been met; and if a terminating condition has been met, select another one of the UV panels for processing if there remain UV panels to be processed, as discussed above with respect to the method 300 of FIG. 3.

Although discussed above primarily with respect to a triangle mesh, it should be understood that techniques disclosed herein may also be applied to other types of 3D geometry, such as polygon meshes made up of shapes other than triangles (e.g., quadrilaterals).

Advantageously, techniques disclosed herein generate UV maps for modified 3D virtual geometry. As a result, the UV maps may be obtained automatically by inputting original 3D geometry, UV panels associated with the original 3D geometry, and the modified 3D geometry, without requiring the artist to manually create UV panels for the modified 3D geometry. Further, the scoring function used to generate UV maps may be changed depending on the application or artistic preferences to require that new principal stretches match the original principal stretches, to allow triangles to scale but not shear, or allow to triangles to shear but not scale, among other things.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A computer-implemented method for generating two-dimensional (2D) panel representations of three-dimensional (3D) geometry, comprising:
    receiving a first 3D geometry, one or more 2D panels associated with the first 3D geometry, and a second 3D geometry, wherein the second 3D geometry is created by deforming the first 3D geometry; and
    for each 2D panel of the one or more 2D panels associated with the first 3D geometry:
        determining principal stretches of a mapping from the first 3D geometry to the 2D panel, wherein the principal stretches include longest and shortest stretches in transforming a plurality of triangles or polygons in the first 3D geometry to corresponding triangles or polygons in the 2D panel, and
        determining a new 2D panel which corresponds to the 2D panel, wherein determining the new 2D panel includes transferring the determined principal stretches, or a function of the determined principal stretches, to a mapping from the second 3D geometry to the new 2D panel.

2. The method of claim 1, wherein transferring the determined principal stretches, or the function of the determined principal stretches, includes, until a termination condition is met, iteratively:
    determining new 2D panel points assuming a fixed first mapping between the second 3D geometry and the new 2D panel;
    determining principal stretches of another mapping from the second 3D geometry to another 2D panel including the new 2D panel points; and
    correcting a matrix of the other mapping for each of a plurality of triangles or polygons in the second 3D geometry so that the matrix is a root of a scoring function.

3. The method of claim 2, wherein the new 2D panel points are determined by solving a linear system.

4. The method of claim 2, wherein correcting the matrix of the other mapping for each of the plurality of triangles or polygons includes:
    determining a singular value decomposition of the matrix; and
    determining a least amount of correction for each of a plurality of singular values of the singular value decomposition such that a matrix with singular values equal to the correction plus the singular values of the singular value decomposition corresponds to a root of the scoring function.

5. The method of claim 2, wherein the scoring function requires, for a given triangle or polygon, associated principal stretches of the mapping from the first 3D geometry to the 2D panel associated with the first 3D geometry to be the same as associated principal stretches of the other mapping from the second 3D geometry to the other 2D panel including the new 2D panel points.

6. The method of claim 2, wherein the scoring function requires, for a given triangle or polygon, a product of associated principal stretches of the mapping from the first 3D geometry to the 2D panel associated with the first 3D geometry to be the same as a product of associated principal stretches of the other mapping from the second 3D geometry to the other 2D panel including the new 2D panel points.

7. The method of claim 2, wherein the scoring function requires, for a given triangle or polygon, a ratio of associated principal stretches of the mapping from the first 3D geometry to the 2D panel associated with the first 3D geometry to be the same as a ratio of associated principal stretches of the other mapping from the second 3D geometry to the other 2D panel including the new 2D panel points.

8. The method of claim 1, wherein the first 3D geometry represents a dress and the second 3D geometry represents a modified dress obtained by deforming the dress represented by the first 3D geometry.

9. The method of claim 1, further comprising, rendering one or more images using the second 3D geometry and the new 2D panels corresponding to the 2D panels associated with the first 3D geometry.

10. The method of claim 1, wherein:
    the first and second 3D geometries are triangle or polygon meshes; and
    the 2D panels associated with the first 3D geometry and the new 2D panels are UV panels.

11. A non-transitory computer-readable storage medium storing a program, which, when executed by a processor performs operations for generating two-dimensional (2D) panel representations of three-dimensional (3D) geometry, the operations comprising:
    receiving a first 3D geometry, one or more 2D panels associated with the first 3D geometry, and a second 3D geometry, wherein the second 3D geometry is created by deforming the first 3D geometry; and
    for each 2D panel of the one or more 2D panels associated with the first 3D geometry:
        determining principal stretches of a mapping from the first 3D geometry to the 2D panel, wherein the principal stretches include longest and shortest stretches in transforming a plurality of triangles or polygons in the first 3D geometry to corresponding triangles or polygons in the 2D panel, and
        determining a new 2D panel which corresponds to the 2D panel, wherein determining the new 2D panel includes transferring the determined principal stretches, or a function of the determined principal stretches, to a mapping from the second 3D geometry to the new 2D panel.

12. The non-transitory computer-readable storage medium of claim 11, wherein transferring the determined principal stretches, or the function of the determined principal stretches, includes, until a termination condition is met, iteratively:

determining new 2D panel points assuming a fixed first mapping between the second 3D geometry and the new 2D panel;

determining principal stretches of another mapping from the second 3D geometry to another 2D panel including the new 2D panel points; and correcting a matrix of the other mapping for each of a plurality of triangles or polygons in the second 3D geometry so that the matrix is a root of a scoring function.

13. The non-transitory computer-readable storage medium of claim 12, wherein the new 2D panel points are determined by solving a linear system.

14. The non-transitory computer-readable storage medium of claim 12, wherein correcting the matrix of the other mapping for each of the plurality of triangles or polygons includes:

determining a singular value decomposition of the matrix; and determining a least amount of correction for each of a plurality of singular values of the singular value decomposition such that a matrix with singular values equal to the correction plus the singular values of the singular value decomposition corresponds to a root of the scoring function.

15. The non-transitory computer-readable storage medium of claim 12, wherein the scoring function requires, for a given triangle or polygon, associated principal stretches of the mapping from the first 3D geometry to the 2D panel associated with the first 3D geometry to be the same as associated principal stretches of the other mapping from the second 3D geometry to the other 2D panel including the new 2D panel points.

16. The non-transitory computer-readable storage medium of claim 12, wherein the scoring function requires, for a given triangle or polygon, a product of associated principal stretches of the mapping from the first 3D geometry to the 2D panel associated with the first 3D geometry to be the same as a product of associated principal stretches of the other mapping from the second 3D geometry to the other 2D panel including the new 2D panel points.

17. The non-transitory computer-readable storage medium of claim 12, wherein the scoring function requires, for a given triangle or polygon, a ratio of associated principal stretches of the mapping from the first 3D geometry to the 2D panel associated with the first 3D geometry to be the same as a ratio of associated principal stretches of the other mapping from the second 3D geometry to the other 2D panel including the new 2D panel points.

18. The non-transitory computer-readable storage medium of claim 11, wherein the first 3D geometry represents a dress and the second 3D geometry represents a modified dress obtained by deforming the dress represented by the first 3D geometry.

19. The non-transitory computer-readable storage medium of claim 11, the operations further comprising, rendering one or more images using the second 3D geometry and the new 2D panels corresponding to the 2D panels associated with the first 3D geometry.

20. A system, comprising:

a processor; and a memory, wherein the memory includes a program configured to perform operations for generating two-dimensional (2D) panel representations of three-dimensional (3D) geometry, the operations comprising:

receiving a first 3D geometry, one or more 2D panels associated with the first 3D geometry, and a second 3D geometry, wherein the second 3D geometry is created by deforming the first 3D geometry, and for each 2D panel of the one or more 2D panels associated with the first 3D geometry:

determining principle principal stretches of a mapping from the first 3D geometry to the 2D panel, wherein the principal stretches include longest and shortest stretches in transforming a plurality of triangles or polygons in the first 3D geometry to corresponding triangles or polygons in the 2D panel; and determining a new 2D panel which corresponds to the 2D panel, wherein determining the new 2D panel includes transferring the determined principle principal stretches, or a function of the determined principal stretches thereof, to a mapping from the second 3D geometry to the new 2D panel.

\* \* \* \* \*

UNITED STATES PATENT AND TRADEMARK OFFICE
CERTIFICATE OF CORRECTION

PATENT NO. : 10,192,346 B2
APPLICATION NO. : 15/279252
DATED : January 29, 2019
INVENTOR(S) : Fernando Ferrari De Goes et al.

Page 1 of 1

It is certified that error appears in the above-identified patent and that said Letters Patent is hereby corrected as shown below:

In the Specification

In Column 1, Line 58, delete "The" and insert -- This --, therefor.

In the Claims

In Column 14, Line 29, in Claim 20, after "determining" delete "principle".

In Column 14, Lines 38-39, in Claim 20, after "determined" delete "principle".

In Column 14, Line 40, in Claim 20, delete "stretches thereof," and insert -- stretches, --, therefor.

Signed and Sealed this
Twenty-third Day of April, 2019

Andrei Iancu
*Director of the United States Patent and Trademark Office*